United States Patent [19]

Dunfield

[11] Patent Number: 5,028,852
[45] Date of Patent: Jul. 2, 1991

[54] POSITION DETECTION FOR A BRUSHLESS DC MOTOR WITHOUT HALL EFFECT DEVICES USING A TIME DIFFERENTIAL METHOD

[75] Inventor: John C. Dunfield, Santa Cruz County, Calif.

[73] Assignee: Seagate Technology, Inc., Scotts Valley, Calif.

[21] Appl. No.: 541,583

[22] Filed: Jun. 21, 1990

[51] Int. Cl.[5] .............................................. H02P 6/02
[52] U.S. Cl. ..................................... 318/254; 318/138
[58] Field of Search ........................ 318/138, 254, 439

[56] References Cited

U.S. PATENT DOCUMENTS

| | | | |
|---|---|---|---|
| 3,909,688 | 9/1975 | Blaschke et al. | 318/227 |
| 4,641,066 | 2/1987 | Nasata et al. | 318/254 |
| 4,673,849 | 6/1987 | Sears et al. | 318/272 |
| 4,678,973 | 7/1987 | Elliot et al. | 318/254 |
| 4,746,850 | 5/1988 | Abbondanti | 318/723 |
| 4,752,724 | 6/1988 | Radziwill et al. | 318/254 |
| 4,777,419 | 10/1988 | Obradovic | 318/696 |
| 4,876,491 | 10/1989 | Squires et al. | 318/138 |
| 4,879,498 | 11/1989 | Shinohara et al. | 318/254 |

OTHER PUBLICATIONS

P. P. Acarnley et al., "Detection of Rotor Position in Stepping and Switched Motors by Monitoring of Current Waveforms", IEEE Transactions on Industrial Electronics, vol. IE-32, No. 3, Aug. 1985.

Primary Examiner—Bentsu Ro
Attorney, Agent, or Firm—Flehr, Hohbach, Test, Albritton & Herbert

[57] ABSTRACT

The present method and apparatus detects the rotor position of a brushless DC motor with an accuracy of $\pi/m$ electrical radians (where m = the number of motor phases) within one electrical period, and provides enough information to enable starting the motor in the correct direction with certainty. After starting the motor in an open loop mode of one or two steps, a closed loop mode may be switched on, using a dynamic indirect position detection as is already well known in the technology. More specifically, the position at start is determined by the injection of short current pulses in different motor phases, each phase or pair of phases being energized first by a pulse of one polarity and of the opposite polarity. The sign of the time difference between the rise times of the induced voltages is detected. By performing a succession of these tests on different phases or pairs of phases of the standing motor, a table of results is established which clearly defines the position of the rotor relative to the motor phases. The same table then defines what polarity currents should be applied to each phase to reliably and certainly start the motor in the proper direction.

22 Claims, 5 Drawing Sheets

---: OPTIONAL

POSITION DETECTION FOR A BRUSHLESS DC MOTOR WITHOUT HALL EFFECT DEVICES USING A TIME DIFFERENTIAL METHOD

CROSS-REFERENCE TO A RELATED APPLICATION

The present invention is useful in a motor such as shown in U.S. application, Ser. No. 115,268, filed Oct. 30, 1987, now U.S. Pat. No. 4,858,044.

FIELD OF THE INVENTION

The present invention relates to method and apparatus for use with a brushless DC motor which provide the capability of detecting the rotor position when the motor is stopped without the use of known rotor position detecting elements such as Hall elements. The method presented here applies to any type of motor having an excitation flux created by a permanent magnet or by DC current excitation of a winding.

BACKGROUND OF THE INVENTION

Briefly stated, a brushless motor is a motor in which the position of magnetic poles of a rotor are detected by means of a detector directly coupled to the shaft of the rotor. In response to the detected position, semiconductor switching elements such as transistors, thyristors or the like are turn on and off so as to continuously generate torque in the motor. Field windings or a multi-segment permanent magnet is used for the rotor.

The torque is created by application of currents to stator or field windings in sequential order to produce a torque-inducing flux for moving a rotor. The DC currents are alternately switched about the field windings to create various current paths that produce magnetic flux orientations in a synchronized fashion. The magnetic flux so produced results in a torque on the motor that causes the desired rotational movement. In order to ensure that current is applied to the proper motor phase, sensing devices are used to provide information about the position of the rotor. Typically, this information is derived through systems such as Hall sensors, optical sensors or resolvers. These different systems do not give an absolute position, but enough information in order to know the relative position of the rotor in one electrical period. Therefore, it is possible using these devices to energize the motor in such a way that it starts in every case in the correct direction.

Of these, the best known and most commonly used, especially in motors where economy and small size are of significant importance, are Hall sensors. However, the position of the Hall elements must be very precisely fixed. Further, the heat resisting temperature of a Hall element is limited, so that deterioration of the characteristics of the motor can occur if the motor is heavily loaded. Another problem with these sensing device is that they are more prone to failure than most of the devices in which they are used. Thus, the Hall device significantly affects the overall reliability of the apparatus that incorporates the sensing device Also, incorporating these sensing devices in the motor structure itself increases the motor size, cost, complexity, power consumption and uses space that could be better utilized to increase the rotor size. Additionally, a number of wire leads must also be provided to each Hall effect device to bring out the information detected by the Hall device to a microprocessor or the like external to the motor shell.

A number of different solutions to indirect position detection that do not require sensors have been developed. For example, methods disclosed to date include direct or indirect back EMF detection as disclosed in V. D. Hair, "Direct Detection of Back EMF in Permanent Magnet Step Motors," Incremental Motion Control Systems and Devices, Symposium, Urbana-Champaign, 1983, pp. 219–221, and K. M. King, "Stepping Motor Control," U.S. Pat. No. 4,138,308, Jan. 23, 1979; a current analysis as disclosed in B. C. Kuo, A. Cassat, "On Current Detection in Variable-Reluctance Step Motors," Incremental Motion Control Systems and Devices, 6th Annual Symposium, Urbana-Champaign, 1977, pp. 205–220; and two third-harmonic analyses as disclosed in P. Ferraris, A. Vagati, F. Villata, "PM Brushless Motor: Self Commutating Prerogatives with Magnetically Anisotropic Rotor," Instituto di Elettriche, Politecnico di Torino, Italia, and R. Osseni, "Modelisation et Auto-Commutation des Moteurs Synchrones," EPFL No. 767, 1989. However, these methods do not provide any information about the position of the rotor at standstill. If the electrical drive system has been switched off and the rotor is not turning, it is not possible to know the actual position as related to the stator phases. Thus, at motor start-up, the motor may start in either the correct or incorrect direction. This may not matter for many applications, but in applications, such as driving the spindle motor in a disc drive, this incorrect starting direction is not acceptable.

One known effort to determine the starting position without the use of sensors is disclosed in British Patent Publication EPA 251,785. According to this method, a short current pulse is applied to each power phase of the motor, and the resulting motor current is measured to determine the positional information of the rotor based on the return pulse of greatest amplitude However, the difference between the pulses returned from the different phases may be very small. Measurement accuracy may be affected by temperature and differences between the phase inductances or phase resistances.

SUMMARY OF THE INVENTION

The present method and apparatus detects the rotor position with an accuracy of $\pi/m$ electrical radians (where m = the number of motor phases) within one electrical period, and provides enough information to start the rotor in the correct direction with certainty. After starting the motor in an open loop mode which starts the rotor in the correct direction, a closed loop mode may be switched on, using a dynamic indirect position detection as is already well known in the technology.

More specifically, the position at start-up is determined by the injection of short current pulses in different motor phases, each phase or pair of phases being energized first by a pulse of one polarity and then of the opposite polarity. The time required for the injected current in each phase to reach a predetermined magnitude is measured. The pulses are long enough to effectuate an accurate measurement, but not so long that the rotor moves. The sign and magnitude of the time difference between the rise times of the two pulses injected into the same phase or pair of phases is detected. By performing a succession of these tests on different phases or pairs of phases of the standing motor, a table of the sign of the differences is established which clearly defines the position of the rotor relative to the motor phases. The same table then defines what polarity currents should be applied to each phase to reliably, and with certainty, start the motor in the proper direction.

Another feature of the present invention is the use of the magnitude of the time difference between the rise times of the two pulses injected into the same phase or pair of phases as a confidence indicator. For example, if the magnitude of the time difference is large, the system is confident that an accurate representation of the rotor position will be realized by the time difference technique. However, if the magnitude of the time difference is small, there is a chance that the sign of the time difference for a given phase may be incorrect as a result of system noise or other anomalies. To alleviate the potential ambiguity, the system can raise the threshold used to measure the rise time, and consequently, increase the relative magnitudes of the rise times and the confidence level This method, in effect, indirectly detects the saturation level of the different motor phases. By using this approach, the measurement is made in such a way that the influence of the temperature on the electrical time constants and the different possible variations in winding parameters do not effect the final detection of the motor position. This method assures starting in the correct direction, and offers the ability to start the motor in the correct direction without detrimental back oscillation.

Other features and advantages of the present invention may become apparent to a person who studies the following disclosure given with respect to the accompanying figures.

DETAILED DESCRIPTION OF A PREFERRED EMBODIMENT

Any polarized motor, such as a brushless DC motor, including permanent magnets or excitation windings, has a local stator and rotor saturation level. As a result of the saturation level of the iron magnetic circuit, phase inductances are a function of rotor position. The approach taken in the present invention is to measure the saturation level of the phase flux versus the current in a phase for each corresponding phase in such a way that the following parameters cannot influence measurement accuracy:

temperature effect on resistance in the phase;

the relatively small differences between the inductances created in the magnetic circuits;

where a relatively high frequency is used to measure the inductance, secondary effects such as eddy currents.

The method disclosed below and the apparatus used to implement it provide a reliable and efficient approach to determining the starting position for a motor, particularly a low power motor.

In the magnetic circuit of a motor phase winding, with current, two effects are superimposed: 1) the permanent magnet flux (or the DC current excitation winding flux); and 2) the current flux. The total flux in a given phase can be expressed as follows:

$$\Psi_{phase} = \Psi_{PM} + L \cdot i$$

where $\Psi_{phase}$ = total flux in the phase $\Psi_{PM}$ = total flux created by the permanent magnet or DC current excitation in the corresponding phase L = inductance of the phase; L is a function of the current i and the motor rotor position $\alpha$ i = current in the phase.

Consequently, the total flux $\Psi_{phase}$ can be increased or decreased by the current effect, thus modifying the saturation level.

If $\Psi_{phase} > \Psi_{PM}$, the magnetic circuit is more saturated due to the additional effect of the current $i^+$, and the corresponding inductance can be written as:

$$L = L_o - \Delta L^+ \qquad [2]$$

where:

$L_o$ = inductance of the phase when current equals zero $\Delta L^+$ = incremental change in inductance when current is different from zero ($i^+$)

$i^+$ = current in the phase, the current creates a positive flux (same flux direction as $\Psi_{PM}$).

On the other hand, if $\Psi_{phase} < \Psi_{PM}$, the magnetic circuit is less saturated due to the subtracting effect of the current $i^-$, and the inductance can be written as follows:

$$L = L_o + \Delta L^- \qquad [3]$$

where:

$\Delta L^-$ = incremental change in inductance when current is different from zero ($i^-$)

$i^-$ = current in phase, the current creates a negative flux (opposite direction than the $\Psi_{PM}$ flux).

Figure 1:
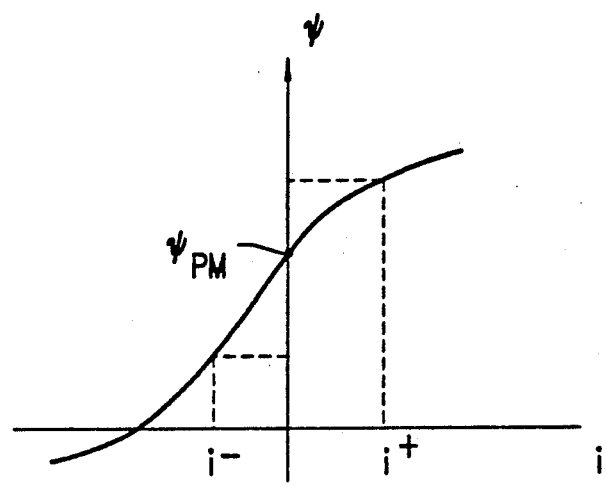
FIG. 1 illustrates phase flux versus current in a phase of a brushless DC motor.

FIG. 1 represents the two possible cases for a given position when motor is in a standstill state.

Current $i^+$ and current $i^-$ are of opposite direction, consequently of opposite sign, and $L = L(i)$.

Instead of directly measuring the inductance, the idea is to analyze the current evolution. At standstill, the phase current can be written as:

$$i = \frac{U}{R}(1 - e^{-\frac{R}{L} \cdot t}) \qquad [4]$$

Where:

U = applied voltage to the phase

R = total resistance of the phase t = time i = current in the phase

Applying equation [4] to the two cases, the current is expressed as follows (see FIG. 2):

$$i^+ = \frac{U}{R}(1 - e^{\frac{-R \cdot t}{L_o - \Delta L^+}}) \qquad [5]$$

-continued $$i^- = \frac{U}{R}(1 - e^{\frac{-R \cdot t}{L_0 + \Delta L^-}}) \quad [6]$$

Figure 2:
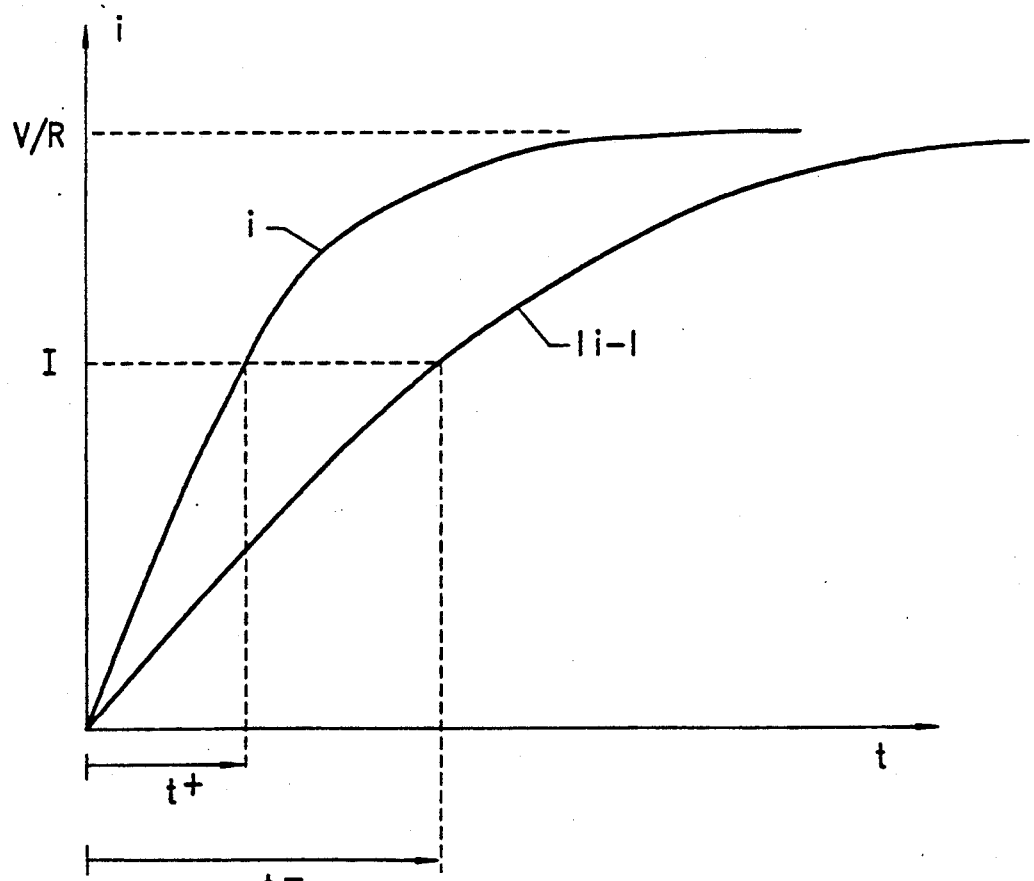
FIG. 2 illustrates current rise versus time in a brushless DC motor.

FIG. 2 shows the two different currents, where current $i^-$ is represented by its absolute value.

Defining a fixed current threshold I, it is possible to compare the time required for each current to reach this predetermined value. The time required to reach an arbitrarily set current magnitude on each current response curve is equal to:

$$t^+ = -\frac{L_0 - \Delta L^+}{R} \cdot \ln\left(1 - \frac{I \cdot R}{U}\right) \quad [7]$$

$$t^- = -\frac{L_0 + \Delta L^-}{R} \cdot \ln\left(1 - \frac{I \cdot R}{U}\right) \quad [8]$$

The difference of the two times is equal to:

$$\Delta t = t^+ - t^-$$

$$\Delta t = \frac{\ln\left(1 - \frac{I \cdot R}{U}\right)}{R}(\Delta L^+ - \Delta L^-) \quad [9]$$

The sign of the time difference $\Delta t$ is a characteristic of the current effect superimposed upon the excitation flux $\Psi_{PM}$ effect. Three cases have to be considered:

Case 1: $\Delta t < 0$

If $\Delta t$ is negative, it indicates that the current $i^+$ creates a flux of the same direction as the excitation flux created by the permanent-magnet (or the DC current excitation winding flux) The current $i^-$ creates a flux of opposite direction to the excitation flux.

Case 2: $\Delta t > 0$

If $\Delta t$ is greater than zero, it indicates that the current $i^+$ creates a flux of opposite direction to the excitation flux. The current $i^-$ creates a flux of the same direction as the excitation flux.

Case 3: $\Delta t = 0$

This case corresponds to a situation where $\Delta L^+ = \Delta L^- \cong 0$ corresponding to a very low saturation level in the corresponding phase.

Consequently, it is possible based on the determination of the sign of the time difference $\Delta t$ to determine the direction of the excitation flux and consequently the motor position at standstill.

Figure 3:
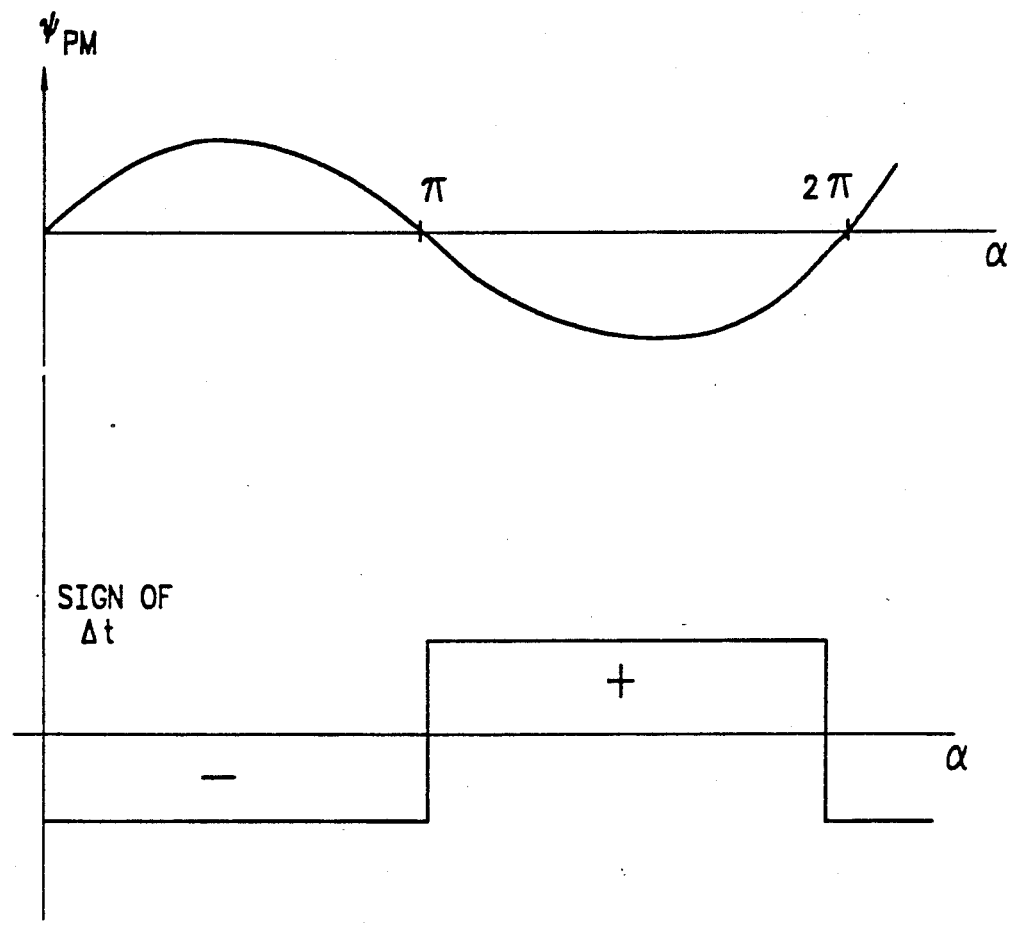
FIG. 3 illustrates the correlation between excitation flux and the sign of the current rise-time difference in a given motor phase versus motor position.

FIG. 3 shows the correlation between the excitation flux $\Psi_{PM}$ and the sign of the time difference $\Delta t$ versus the motor position (motor at standstill) with respect to a single phase Note that the sign of $\Delta t$ for a single phase is determinative of the rotor position to an accuracy of.

In a motor having m phases, such a measurement of the sign of the time difference $\Delta t$ can be determined in each phase. The corresponding determination of the motor position is therefore given with an accuracy of $\pi/m$ electrical radians. That is, the accuracy with which motor position is determined is greater where a sequence of the different phases of the motor are excited at standstill.

Figure 4:
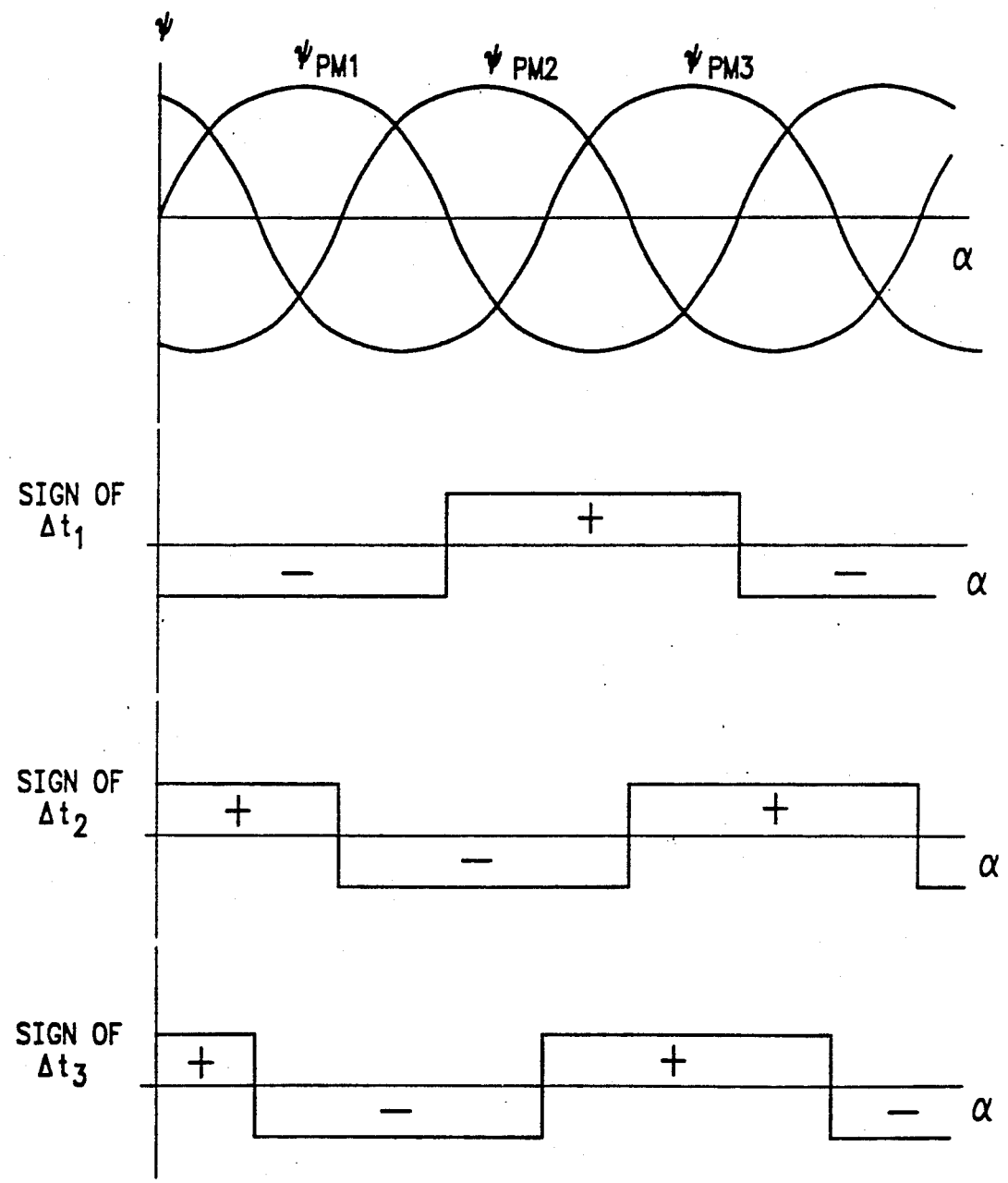
FIG. 4 illustrates the correlation between the excitation flux and corresponding sign of the motor current rise-time differences for a three-phase motor.

For example, for a three-phase motor, the excitation flux created by the permanent magnet (or the DC current excitation winding) are shifted from one phase to the other by $2\pi/m$ electrical radian (m=3). The measurements of the time difference $\Delta t$ in each phase permits determining the motor position with an accuracy of $\pi/3$ or 60 electrical degrees. FIG. 4 shows such a configuration, and the correlation between the different excitation flux $\Psi_{PM}$ and the corresponding time differences $\Delta t$, for a three-phase motor. In FIG. 4:

$\alpha$ = motor rotor position in electrical degree;
$\Psi_{PM1}$ = excitation flux in phase 1;
$\Psi_{PM2}$ = excitation flux in phase 2;
$\Psi_{PM3}$ = excitation flux in phase 3;
$\Delta t_1$ = time difference in phase 1;
$\Delta t_2$ = time difference in phase 2; and
$\Delta t_3$ = time difference in phase 3.

Consequently, there is a unique distribution of the signs of the different time differences representing the motor rotor position over one electrical period of the excitation flux. Therefore, by exciting the phases of the motor and defining a table of the signs of the current differences, the rotor position can be uniquely and accurately established.

Another way to measure indirect saturation detection is current integration. It can be advantageous to measure the sign of the difference in time required for the integration of the excitation current in each phase to attain a set value.

Another possible way to measure the same phenomena which gives the same result is to determine the sign of the difference in the time required for the derivative of the excitation current to reach a set value.

An improvement on the present invention is realized by utilizing the magnitude of the time difference to provide a confidence indicator as to the validity of the sign determination. For example, the system may not decide on the correct value of the sign if the magnitude is small and susceptible to noise corruption. Therefore, a higher confidence is realized if the magnitude of the difference is significant. A determination of a low confidence level will inhibit the use of the position information and the position detection process is repeated. If a variable reference source is used, the threshold level I may be raised to create a larger time difference, see FIG. 2, and increase the confidence in the measurement. However, the addition of the magnitude analyzer and variable threshold circuitry increases the complexity of the system.

Figure 5:
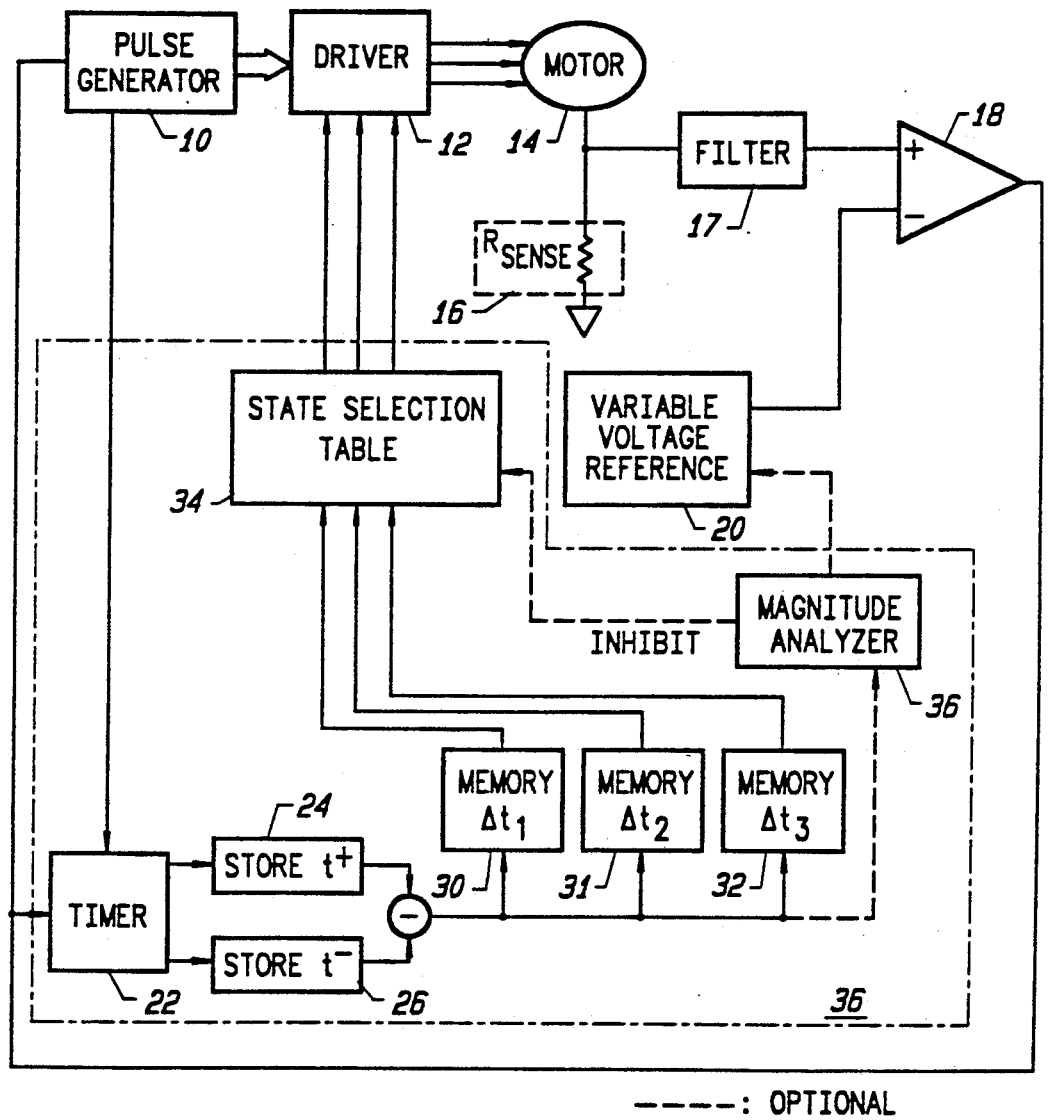
FIG. 5 is a block diagram which may be used to understand the approach to position detection according to the present invention.

An example of the apparatus used to measure motor position at standstill using the method of the present invention is depicted in FIG. 5 for a three-phase motor. The process as described in following discussion is not intended to be exhaustive, but merely an example.

According to this exemplary embodiment, using a pulse generator 10 through a driver 12, each phase of a motor 14 is supplied first with a positive current and then with a negative current. The pulse generator also triggers the timer 22 to begin at the leading edge of the excitation current pulse. Most simply, timer 22 is a digital counter.

The excitation current is converted to a voltage as it passes through the sensing resistor 16. The voltage is filtered to remove noise by filter 17. Each phase is supplied the current until the voltage across the sense resistor 16 becomes larger than the comparator's 18 reference voltage 20. At this point, the comparator's output toggles to a new state and signals both the pulse generator 10 and the timer 22 to stop. The elapsed time from pulse start until the comparator is triggered is stored in memory 24. The same phase is now energized using a negative current through driver 12. The resulting current is converted to a voltage at resistor 16 and voltage triggers a comparator 18 when it exceeds a predetermined threshold set by a voltage source 20. The timer 22 is again triggered by a signal from the signal generator 10 which corresponds to the leading edge of the current pulse and is stopped by the comparator 18 trigger. The duration of the signal is stored in memory 26.

The reference voltage source 20, in its simplest form, is fixed. The same power supply used to power the other components of the system should be used as the reference source 20. This will take advantage of the common-mode rejection of the comparator 18 to limit the effects of power supply noise on the position detection system. To enhance the system's efficacy, source flexibility using a digital-to-analog converter controlled by a micro processor is useful in tailoring the reference voltage to a specific application or allowing the reference voltage to be dynamically changed to accommodate motor parameter variations. In addition, the reference threshold can be adjusted to increase the magnitude of the time difference in response to an analysis of the same.

The two stored time values are subtracted 28 and the sign of the difference is stored in another memory location 30. The timer 22, subtractor 28, and all of the memory locations 24, 26, 30, 31, 32 could either be constructed using hardware components or their functions could be accomplished by the disk drive's on-board microprocessor as software functions.

The process described above is repeated for each of the windings resulting in two more memory locations 31, 32 being filled with sign values. The vector of sign values is used to point into a look-up table. The look-up table provides the phase excitation order necessary to start the motor in the proper direction. The correct phase excitation order is sent to driver 12 and motor 14 is started in the desired direction. However, if the magnitude of the time difference for any one of the phases indicates that the position may be erroneous, the state selection process will be inhibited and the position detection process will be repeated using a different reference voltage level.

The table below depicts a typical look-up table for a 3-phase star configuration motor. The sign of the time difference is encoded such that a positive value is a digital 1 and a negative value is a digital 0. The three bit vector describes a particular rotor position with a $\pi/3$ or 60 degree accuracy. Using this position vector, the corresponding phase excitation sequence is determined and executed.

The following table provides the first switching sequence:

| Rotor Position in Electrical Degree | Sign of | | | Phase Excitation | | |
|---|---|---|---|---|---|---|
| | $\Delta t1$ | $\Delta t2$ | $\Delta t3$ | 01 | 02 | 03 |
| 0 ± 30 | 0 | 1 | 0 | 1 | 0 | 0 |
| 60 ± 30 | 0 | 1 | 1 | 1 | 1 | 0 |
| 120 ± 30 | 0 | 0 | 1 | 0 | 1 | 0 |
| 180 ± 30 | 1 | 0 | 1 | 0 | 1 | 1 |
| 240 ± 30 | 1 | 0 | 0 | 0 | 0 | 1 |
| 300 ± 30 | 1 | 1 | 0 | 1 | 0 | 1 |

This combination of circuitry and software insures that the rotor will start in the correct direction without the use of Hall devices or other more intrusive means of detecting rotor position.

Figure 6:
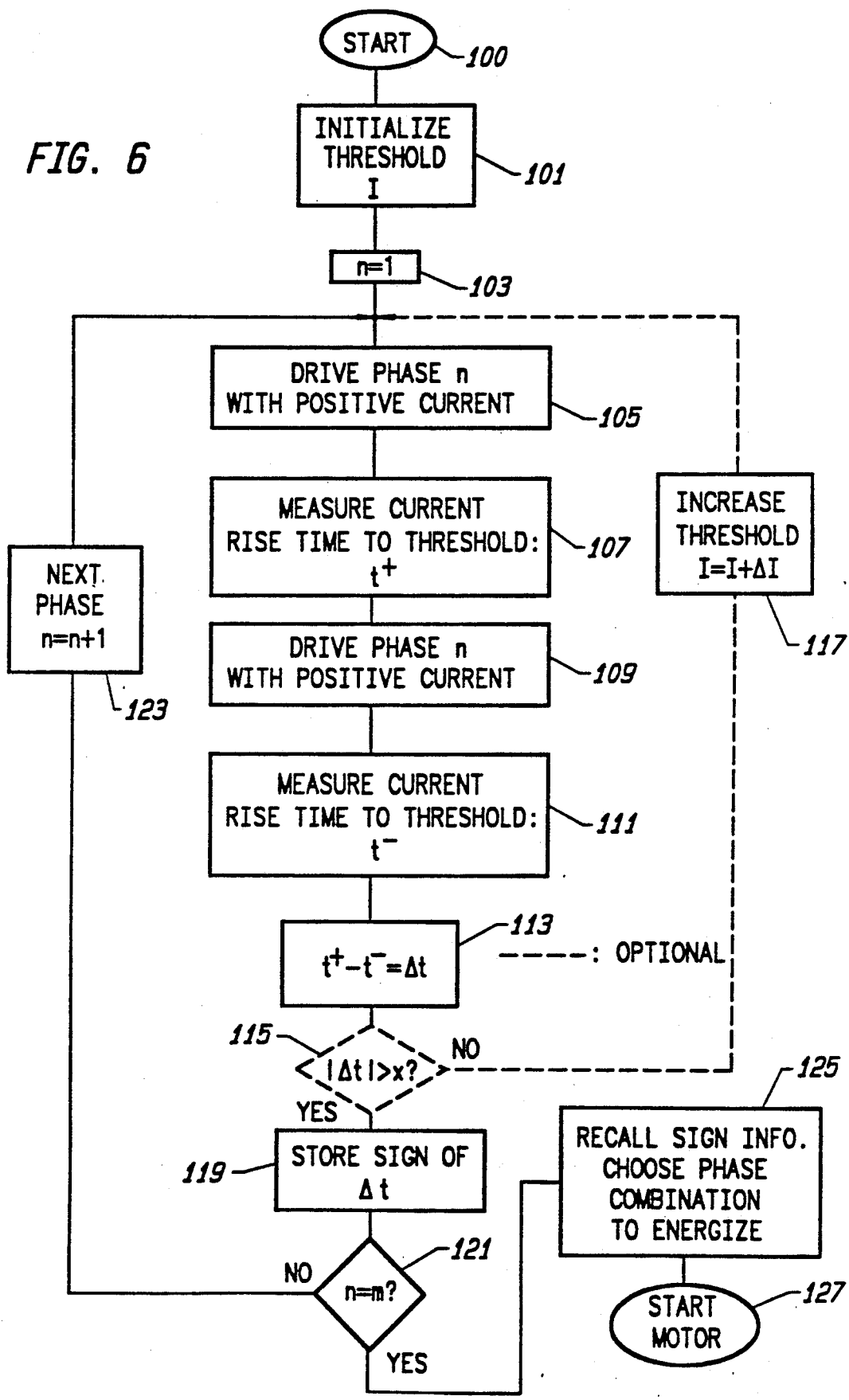
FIG. 6 is a flow chart summarizing the rotor position detection and motor start-up process of the present invention.

In summary, the present invention can be depicted as a flow chart as shown in FIG. 6. The motor 14 is at a standstill at the flow chart start 100. Both the threshold level I and the phase counter must be initialized 101, 103. Phase n, or a combination of phases n, is driven in step 105 with a short positive current pulse. The time duration for the pulse to rise from 0 to the threshold level I is measured in step 107 as $t^+$. The same phase is then pulsed with a short negative current and the rise time is again measured. The negative pulse's rise time is represented by $t^-$. In step 113, the rise time from the negative pulse $t^-$ is subtracted from the rise time of the positive pulse $t^+$. The result is the time difference between the rise times represented by $\Delta t$.

The sign of at is stored in memory at step 119. Step 121 determines if all the phases m have been tested. If not, the phase number is incremented by 1, step 123, and the process repeats at step 105 by pulsing the next phase. If all of the phases have been addressed by the system, i.e., n equals m, then the stored values of the sign of the time differences are accessed and used to determine the position of the rotor at step 125. A look-up table, as previously described, is used to determine which phases must be energized to accurately start the motor and the motor is started in step 127. Thus, ending the process of the present invention.

However, at the expense of additional complexity, improvement in the position detection system's performance is achievable. The sign of the difference may not be determinable if the magnitude is small and corrupted by noise. Therefore, step 115 compares the magnitude of $\Delta t$ to a confidence factor X. The magnitude of X depends on motor characteristics. If $\Delta t$ is less than X, the system is not confident that the sign of $\Delta t$ is accurately determinable. Subsequently, step 117 is initiated. It adds an increment to the threshold level I and then returns the process to step 105, repeating the position detection process and achieving a greater time differential between $t^-$ and $t^+$. However, the additional increment will slow the position determination process.

While the present invention has been described with reference to a specific embodiment, the description is illustrative of the invention. Various modifications may occur to those skilled in the art without departing from the true spirit and scope of the invention as defined by the appended claims.

What is claimed is:

1. In a brushless DC motor having multiple phase windings arranged as a stator and a rotor having a permanent magnet or a DC current excitation winding, apparatus for controlling ordered application of electrical current to the phase windings and measuring the response thereto comprising:

circuit means coupled to the phase windings for selectively establishing current paths through selected windings in response to control signals, driver means for applying short duration current pulses of first and second opposite polarities to each said selected winding, monitoring means for detecting the voltage detected at a current voltage converter connected to the energized winding by each of said applied current pulses of opposite polarities, and detection means for identifying a rotational position of said rotor relative to said windings based on the sign of the time difference between the rise time of the responses to said pulses applied to the same selected winding.

2. The motor of claim 1 wherein said windings are ordered in phases and said driver means apply current pulses first of one polarity and then of the opposite polarity to the same one of said phases, said monitoring means detecting the output of the current-voltage converter established in response to said applied current pulses.

3. The brushless DC motor of claim 1 wherein said windings are arranged in three phases, said phases being selectively connected in pairs so that the current pulses are applied with alternating polarities to each pair of the plurality of pairs.

4. The brushless DC motor of claim 1 wherein said detection means determines the rise time of each of said responses to said current pulses from zero amplitude to a fixed reference level, subtracts one of said rise times from the other of said rise times, determines the magnitude of said rise time difference, and determines said sign of said rise time difference.

5. The motor of claim 4 wherein said sign of said rise time difference is used to determine the rotor position within said motor and said magnitude of said rise time difference is used to determine the accuracy of said rotor position determination.

6. The brushless DC motor of claim 4 wherein said reference level is variable and varied depending on said magnitude of said rise time difference.

7. A commutator less direct current motor comprising
 a plurality of windings connected to define m phases of said motor,
 a rotor having a permanent magnet or DC current excitation winding positioned relative to said plurality of windings and rotatable relative to said windings and comprising means for establishing first, fixed magnetic fields,
 driver means connected to said plurality of windings for applying short term current pulses of opposite polarity separately to at least two different phases thereof for inducing at least two second, controlled magnetic fields,
 monitoring means for detecting each current established by said applied current pulses, each said current representing the interaction of said first, fixed magnetic field and said second, current pulse induced magnetic field, and
 detection means for identifying a rotational position of said rotor relative to said windings based on the sign of the time difference between the rise time of the responses to said pulses.

8. The motor of claim 7 wherein said monitoring means detects the voltage at a current voltage converter coupled to said energized phase obtained in response to the application of each current pulse to each said phase of windings.

9. The motor of claim 7 wherein said windings are arranged in three phases, said phases being selectively connected in pairs so that the current pulses are applied with alternating polarities to each pair of the plurality of pairs.

10. The motor of claim 7 wherein said detection means determines the rise time of each of said responses to said current pulses from zero amplitude to fixed reference level, subtracts one of said rise times from the other of said rise times, determines the magnitude of said rise time difference, and determines said sign of said rise time difference.

11. The motor of claim 10 wherein said sign of said rise time difference is used to determine the rotor position within said motor and said magnitude of said rise time difference is used to determine the accuracy of said rotor position determination.

12. The motor of claim 11 wherein said reference level is variable and varied depending on said magnitude of said rise time difference.

13. The motor of claim -7 wherein said driver means connected to said plurality of windings for applying said short term current pulses to at least two different combinations of said phases thereof comprising at least on phase connected in series with at least a pair of said phases connected in parallel, for inducing at least two second, controlled magnetic fields.

14. In a brushless DC motor having multiple phase windings arranged as a stator and a rotor having a permanent magnet or a DC current excitation winding, a method for controlling ordered application of electrical current to the phase windings and measuring the response thereto to determine the initial position of said rotor comprising the steps of
 coupling circuit means to the windings for selectively establishing current paths through a selected winding or windings in response to control signals,
 applying short duration current pulses of first and second opposite polarities to each said selected winding,
 detecting the voltage detected at a current voltage converter connected to the energized winding by each of said applied current pulses of opposite polarities, and
 identifying a rotational position of said rotor relative to said windings based on the sign of the time difference between the rise time of the responses to said pulses applied to the same selected winding.

15. The brushless DC motor of claim 14 wherein said windings are ordered in phases and said applied current pulses are first of one polarity and then of the opposite polarity to the same one of said phases, said detecting step monitoring the output of the current voltage converter established in response to said applied current pulses.

16. The brushless DC motor of claim 14 wherein said windings are arranged in three phases, said phases being selectively connected in pairs so that the current pulses are applied with alternating polarities to each pair of the plurality of pairs.

17. The brushless DC motor of claim 14 wherein said short duration current pulses are applied to series connected windings.

18. The brushless DC motor of claim 14 wherein said short duration current pulses are applied to sets of said windings comprising a winding connected in series with a pair of said windings connected in parallel.

19. The brushless DC motor of claim 14 wherein the rotational position is determined based on first applying selected current pulses to each individual winding of said windings, and thereafter to each potential series connected pair of said windings.

20. The brushless DC motor of claim 14 wherein said method further includes the steps of determining the rise time of each of said responses to said current pulses from zero amplitude to a fixed reference level, subtracting one of said rise times from the other of said rise times, determining the magnitude of said rise time difference, and determining said sign of said rise time difference.

21. The brushless DC motor of claim 20 wherein said method further includes the steps of determining the rotor position within said motor using said sign of said rise time difference and determining the accuracy of said rotor position determination using said magnitude of said rise time difference.

22. The brushless DC motor of claim 20 wherein said method further includes the steps of using a variable reference level and varying said variable reference level depending on said magnitude of said rise time difference.

* * * * *